United States Patent
Piedra Clemente

(10) Patent No.: US 12,297,350 B2
(45) Date of Patent: May 13, 2025

(54) THERMOPLASTIC POLYURETHANE AND PROCESS FOR MAKING A THERMOPLASTIC POLYURETHANE AND COMPONENTS THEREOF

(71) Applicant: Lubrizol Advanced Materials, Inc., Cleveland, OH (US)

(72) Inventor: Trinidad Piedra Clemente, Barcelona (ES)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 634 days.

(21) Appl. No.: 17/632,285

(22) PCT Filed: Aug. 4, 2020

(86) PCT No.: PCT/US2020/044813
§ 371 (c)(1),
(2) Date: Feb. 2, 2022

(87) PCT Pub. No.: WO2021/026108
PCT Pub. Date: Feb. 11, 2021

(65) Prior Publication Data
US 2022/0289970 A1 Sep. 15, 2022

(30) Foreign Application Priority Data
Aug. 5, 2019 (EP) .................................... 19382682

(51) Int. Cl.
| | | |
|---|---|---|
| C08L 75/06 | (2006.01) |
| C08G 18/12 | (2006.01) |
| C08G 18/32 | (2006.01) |
| C08G 18/40 | (2006.01) |
| C08G 18/42 | (2006.01) |
| C08G 18/46 | (2006.01) |
| C08G 18/48 | (2006.01) |
| C08G 18/50 | (2006.01) |
| C08G 18/61 | (2006.01) |
| C08G 18/65 | (2006.01) |
| C08G 18/73 | (2006.01) |
| C08G 18/76 | (2006.01) |
| C08L 75/08 | (2006.01) |

(52) U.S. Cl.
CPC .............. *C08L 75/06* (2013.01); *C08G 18/12* (2013.01); *C08G 18/3206* (2013.01); *C08G 18/4018* (2013.01); *C08G 18/4277* (2013.01); *C08G 18/4692* (2013.01); *C08G 18/4854* (2013.01); *C08G 18/5096* (2013.01); *C08G 18/61* (2013.01); *C08G 18/6511* (2013.01); *C08G 18/73* (2013.01); *C08G 18/7671* (2013.01); *C08L 75/08* (2013.01); *C08L 2201/08* (2013.01)

(58) Field of Classification Search
CPC ............................ C08G 18/4277; C08G 18/61
See application file for complete search history.

(56) References Cited

U.S. PATENT DOCUMENTS

| | | | | |
|---|---|---|---|---|
| 5,945,185 A * | 8/1999 | Hirai | ................... | C08G 18/4854 280/743.1 |
| 6,239,069 B1 * | 5/2001 | Asai | ..................... | B41M 7/0027 503/227 |
| 2002/0077444 A1 | 6/2002 | Matsumoto et al. | | |
| 2008/0300377 A1 * | 12/2008 | Nefzger | ............. | C08G 18/4277 528/65 |
| 2011/0102736 A1 * | 5/2011 | Wu | ......................... | G02C 7/04 427/164 |
| 2012/0277394 A1 * | 11/2012 | Taniguchi | .......... | C08G 18/0852 252/183.11 |

FOREIGN PATENT DOCUMENTS

WO    2012/023358    2/2012

* cited by examiner

*Primary Examiner* — Mark S Kaucher
(74) *Attorney, Agent, or Firm* — Eryn Ace Fuhrer; Michael A. Miller

(57) ABSTRACT

A heat resistant thermoplastic polyurethane composition is made by a reaction including a polyol component comprising the reaction of ε-caprolactone initiated with a polydimethylsiloxane and a polyether polyol.

22 Claims, No Drawings

THERMOPLASTIC POLYURETHANE AND PROCESS FOR MAKING A THERMOPLASTIC POLYURETHANE AND COMPONENTS THEREOF

CROSS REFERENCE TO RELATED APPLICATION

This application claims priority from PCT Application Serial No. PCT/US2020/044813 filed on Aug. 4, 2020, which claims the benefit of European Patent Application EP19382682 filed on Aug. 5, 2019, the entirety of both of which is hereby incorporated by reference.

BACKGROUND

The utility of thermoplastic polyurethane materials for a variety of applications is being appreciated in many new industries. However, one drawback often seen with thermoplastic polyurethane materials is a loss of performance when exposed to elevated temperatures.

Thus, there is a need for a thermoplastic polyurethane composition that maintains good physical properties in high heat applications.

SUMMARY OF THE INVENTION

The present invention is a thermoplastic polyurethane composition comprising the reaction product of a polyol component and a polyisocyanate component, wherein the polyol component comprises the reaction product of ε-caprolactone initiated with a polysiloxane and a polyether. In one embodiment, the polyol component of the present invention comprises the reaction product of ε-caprolactone, polysiloxane, and polyether, in sufficient amounts to form a polyol having a number-average molecular weight of 1,000 to 10,000, for example, 2,000 to 10,000, or even 2,000 to 4,000, or even 3,000 to 4,000.

The present invention also includes a method of making a polyol having tailored bimodal distribution which includes the steps of (i) preparing a reaction mixture of a polysiloxane initiator with ε-caprolactone; (ii) reacting the polysiloxane initiator with the ε-caprolactone to form an polysiloxane-polycaprolactone copolyol until free caprolactone in the reaction mixture is less than 0.25% by weight; (iii) adding additional ε-caprolactone along with a polyether initiator to the reaction mixture; (iv) reacting the additional ε-caprolactone and polyether initiator with the polysiloxane-polycaprolactone copolyol until the free caprolactone in the reaction mixture is less than 0.25% by weight. The amounts and ratios of reactants are chosen to form a polyol having a number average molecular weight of 1,000 to 10,000, for example, 2,000 to 10,000, or even 2,000 to 4,000, or even 3,000 to 4,000. The invention also comprises a method of making a thermoplastic polyurethane comprising a polyol made as described above and reacting the polyol with a diisocyanate and, optionally, a chain extender.

DETAILED DESCRIPTION

Thermoplastic polyurethane compositions are generally formed from the reaction product of a polyol component, a diisocyanate component, and optionally, a chain extender component. Each of the components as useful in the present invention is described in detail in the following description.

Polyol Component

In the present invention, the polyol component used to prepare the thermoplastic polyurethane composition of the present invention comprises the reaction product of ε-caprolactone initiated with a polysiloxane polyol and a polyether polyol. The polyol component of the present invention has a number-average molecular weight of about 1500 to 10,000, for example 2000 to 4000, further for example, about 3000 to 4000, further for example, about 3500.

ε-Caprolactone or simply caprolactone is a lactone (a cyclic ester) possessing a seven-membered ring. ε-Caprolactone is a well-known monomer in the art.

Suitable polysiloxane polyols include α-ω-hydroxyl or amine or carboxylic acid or thiol or epoxy terminated polysiloxanes. Examples include poly(dimethysiloxane) terminated with a hydroxyl or amine or carboxylic acid or thiol or epoxy group. In some embodiments, the polysiloxane polyols are hydroxyl terminated polysiloxanes. In some embodiments, the polysiloxane polyols have a number-average molecular weight in the range from 300 to 5,000, or from 400 to 3,000, for example 500 to 2,200. As described herein, number average molecular weight is determined by assay of the terminal functional groups.

Polysiloxane polyols may be obtained by the dehydrogenation reaction between a polysiloxane hydride and an aliphatic polyhydric alcohol or polyoxyalkylene alcohol to introduce the alcoholic hydroxy groups onto the polysiloxane backbone.

In some embodiments, the polysiloxanes may be represented by one or more compounds having the following formula:

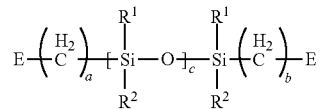

in which: each $R^1$ and $R^2$ are independently, hydrogen, a 1 to 4 carbon atom alkyl group, a benzyl, or a phenyl group; each E is OH or $NHR^3$ where $R^3$ is hydrogen, a 1 to 6 carbon atoms alkyl group, or a 5 to 8 carbon atoms cyclo-alkyl group; a and b are each independently an integer from 2 to 8; c is an integer from 3 to 50. In amino-containing polysiloxanes, at least one of the E groups is $NHR^3$. In the hydroxyl-containing polysiloxanes, at least one of the E groups is OH. In some embodiments, both $R^1$ and $R^2$ are methyl groups.

Examples of polysiloxane materials that can be used in this invention include dihydroxypolydimethyl siloxane, α,ω-hydroxypropyl terminated poly(dimethylsiloxane) and α,ω-amino propyl terminated poly(dimethylsiloxane), both of which are commercially available materials. Further examples include copolymers of the poly(dimethylsiloxane) materials with a poly(alkylene oxide).

Suitable polyether polyols include polyether polyols derived from a diol or polyol having a total of from 2 to 15 carbon atoms, in some embodiments an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, poly(propylene glycol) comprising propylene oxide reacted with propylene glycol, poly(tetramethylene ether glycol)

comprising water reacted with tetrahydrofuran which can also be described as polymerized tetrahydrofuran, and which is commonly referred to as PTMG. Suitable polyether polyols also include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the described compositions. Typical copolyethers include the reaction product of THF and ethylene oxide or THF and propylene oxide. These are available from BASF as PolyTHF® B, a block copolymer, and PolyTHF® R, a random copolymer. The various polyether intermediates generally have a number average molecular weight (Mn) as determined by assay of the terminal functional groups which is an average molecular weight greater than about 700, such as from about 700 to about 10,000, from about 1,000 to about 5,000, or from about 1,000 to about 2,500.

To form the polyol component of the present invention, the ε-caprolactone, polysiloxane, and polyether are combined into a reaction mixture in sufficient amounts to form a polyol having a number-average molecular weight of 1,000 to 10,000, for example, 2,000 to 10,000, or even 2,000 to 4,000, or even 3,000 to 4,000. The combination of the components will be performed as is generally understood by those skilled in the art considering the molecular weight of each component and the desired molecular weight of the final polyol. In one embodiment, the invention includes a polyol component which comprises the reaction product of 24% to 94% by weight of ε-caprolactone, 3.5% to 66% by weight of polysiloxane, and 2.5% to 21% by weight % of polyether. For example, in one embodiment, the invention includes a polyol component which comprises the reaction product of polysiloxane having a number-average molecular weight of 500 to 10,000, and a polyether having a molecular weight of 500 to 1000, with the balance of the composition being ε-caprolactone to form a polyol having the desired molecular weight, for example, between 1500 and 10,000.

In one embodiment, the polyol component used in the present invention is made under polymerization conditions to make a polymer having tailored bimodal distribution. The process for making this polyol includes adding the ε-caprolactone, the polysiloxane initiator, and optionally, a catalyst such as tin dioctoate to a reactor. The reaction is allowed to proceed until the free caprolactone monomer in this reaction is below 0.25%. At that point, additional ε-caprolactone is added along with the second polyether initiator. Without being limited to any particular theory, it is believed that this reaction results in a bimodal polycaprolactone polyol. The amounts and ratios of ε-caprolactone, polysiloxane, and polyether are selected so as to form a polyol a number-average molecular weight of 1,000 to 10,000, for example, 2,000 to 10,000, or even 2,000 to 4,000, or even 3,000 to 4,000, as would be understood by those skilled in the art.

For example, in an embodiment of the invention, the process for making the polyol component includes mixing polysiloxane initiator and ε-caprolactone in a 1:12 to 1:15 molar ratio and reacting the mixture to form a polyol intermediate which includes the polyol species represented by Formula I:

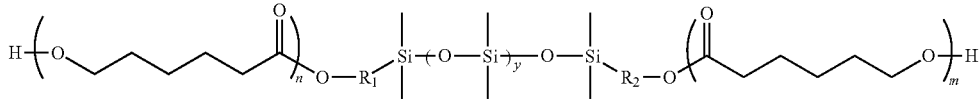

where n and m may be the same or different, n or m may be 0 to 15, provided that n+m is at least 12, for example, 12-15, further for example, 12, 13, 14, or 15; y may be 25 to 33, for example, 25, 26, 27, 28, 29, 30, 31, 32, or 33; $R_1$ and $R_2$ may be the same or different and are linear or branched $C_1$ to $C_{10}$ groups, for example, methyl, ethyl, n-propyl, iso-propyl, n-butyl, iso-butyl, phenyl, cyclohexyl, methoxyethyl, or 3,3'-oxydipropyl.

When the reaction mixture containing the intermediate of Formula I reaches 0.25% or less of free caprolactone monomer, then additional ε-caprolactone and polyether, for example, polytetramethylene ether glycol, are added to the reaction mixture. The reaction is allowed to proceed until 0.25% or less of free caprolactone monomer is measured. The resulting polyol will have a number-average molecular weight of 1500 to 10,000, for example 2000 to 4000, further for example, about 3000 to 4000, further for example, about 3500.

In another embodiment, the polyol component comprises a bimodal polycaprolactone polyol that contains caprolactone, polysiloxane, and polyether in the same polyol molecule.

Polyisocyanate Component

Polyisocyanates useful for preparing the thermoplastic polyurethane compositions of the present invention include one or more diisocyanates, typically selected from aromatic polyisocyanates or aliphatic polyisocyanates or combinations thereof. Examples of useful polyisocyanates include aromatic diisocyanates such as 4,4'-methylenebis(phenyl isocyanate) (MDI), m-xylene diisocyanate (XDI), 3,3'-dimethoxy-4,4'-biphenylenediisocyanate, phenylene-1,4-diisocyanate (PDI), phenylene-1,3-diisocyanate, naphthalene-1,5-diisocyanate, 3,3'-dimethyl-4,4'-biphenylene diisocyanate (TODI), 1,5-naphthalene diisocyanate (NDI), and toluene diisocyanate (TDI); as well as aliphatic diisocyanates such as isophorone diisocyanate (IPDI), 1,4-cyclohexyl diisocyanate (CHDI), decane-1,10-diisocyanate, lysine diisocyanate (LDI), 1,4-butane diisocyanate (BDI), hexamethylene diisocyanate (HDI), 1,4-Bis (isocyanatomethyl) cyclohexane (1,4-H6XDI), and dicyclohexylmethane-4,4'-diisocyanate (H12MDI). Mixtures of two or more polyisocyanates may be used.

In one embodiment, the polyisocyanate component consists essentially of or consists of 4,4'-methylenebis(phenyl isocyanate). In another embodiment, the polyisocyanate consists essentially of or consists of hexamethylene diisocyanate.

The Chain Extender Component

The thermoplastic polyurethane compositions described herein optionally include a chain extender component. Chain extenders include diols, diamines, and combination thereof.

Suitable chain extenders include relatively small polyhydroxy compounds, for example lower aliphatic or short chain glycols having from 2 to 20, or 2 to 12, or 2 to 10 carbon atoms. Suitable examples include ethylene glycol, diethylene glycol, triethylene glycol, tetraethylene glycol, propylene glycol, dipropylene glycol, 1,4-butanediol (BDO), 1,6-hexanediol (HDO), 1,3-butanediol, 1,5-pentanediol, neopentylglycol, 1,4-cyclohexanedimethanol (CHDM), 2,2-bis[4-(2-hydroxyethoxy) phenyl]propane (HEPP), heptanediol, nonanediol, dodecanediol, 3-methyl-1,5-pentanediol, and hydroxyethyl resorcinol (HER), pentaspiro glycol (PSG), hydroquinone bis(2-hydroxyethyl) ether hyroquinone (HQEE), dipropylene glycol (DPG), 2-methyl-1,3-propane diol, 2-butyl-2-ethyl-1,3-propane diol (BEPD), and the like, as well as mixtures thereof. In one embodiment of the present invention, the chain extender consists essentially of or consists of 1,4-butanediol. In another embodiment, the chain extender component consists essentially of or consists of hydroquinone bis(2-hydroxyethyl) ether hydroquinone. In another embodiment, the chain extender component consists essentially of or consists of pentaspiro glycol. In another embodiment, the chain extender component consists essentially of or consists of pentaspiro glycol. As used herein, "pentaspiro glycol" or PSG refers to a polyol such as is described in U.S. Pat. No. 2,945,008, for example, 3,9-bis(1,1-dimethyl-2-hydroxyethyl)-2,4,8,10-tetraoxaspiro[5.5]undecane represented by the Formula:

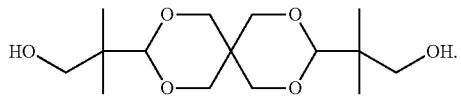

To prepare thermoplastic polyurethane compositions in accordance with the present invention, the components (the polyol, the diisocyanate, and the optional chain extender) may be reacted together to form the thermoplastic polyurethane compositions of the present invention. Any known processes to react the components may be used to make the thermoplastic polyurethane composition of the present invention. In one embodiment, the process is a so-called "one-shot" process where all three components are added to an extruder reactor and reacted.

The thermoplastic polyurethane composition of the invention can also be prepared utilizing a pre-polymer process. In the pre-polymer route, the polyol intermediates are reacted with generally an equivalent excess of one or more diisocyanates to form a pre-polymer solution having free or unreacted diisocyanate therein. Subsequently, a chain extender, as noted above, is added in an equivalent amount generally equal to the isocyanate end groups as well as to any free or unreacted diisocyanate compounds. Typically, the pre-polymer route can be carried out in any conventional device including an extruder. In such embodiments, the polyol intermediates are reacted with an equivalent excess of a diisocyanate in a first portion of the extruder to form a pre-polymer solution and subsequently the chain extender is added at a downstream portion and reacted with the pre-polymer solution.

The present invention includes a process for making a thermoplastic polyurethane comprising the steps of (i) making a polyol comprising the reaction product of ε-caprolactone initiated with a polydimethylsiloxane polyol and a polyether polyol; (ii) reacting the polyol with a diisocyanate, and optionally, a chain extender. Th step of making the polyol comprises the steps of (a) providing a reaction mixture comprising ε-caprolactone and polysiloxane initiator in a molar ratio of 1:12 to 1:15; (b) reacting the reaction mixture to form a polyol intermediate species; (c) adding additional ε-caprolactone and polyether initiator to the reaction mixture and polyol intermediate species to form a polyol. For example, the polyol intermediate species may comprise

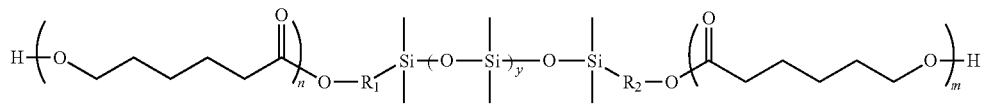

where n and m are individually 0 to 15, provided that n+m is at least 12, y is 25 to 33, and $R^1$ and $R^2$ are the same or different and are selected from linear or branched $C_1$ to $C_{10}$ groups, for example, $R^1$ and $R^2$ are the same or different and are selected from methyl, ethyl, n-propyl, iso-propyl, n-butyl, iso-butyl, phenyl, cyclohexyl, methoxyethyl, or 3,3'-oxidipropyl. In one embodiment, both $R_1$ and $R_2$ are $CH_2$—$CH_2$—$CH_2$.

The invention also includes making an article from a thermoplastic polyurethane composition which comprises the steps of (i) making a polyol component by reacting ε-caprolactone with a polysiloxane polyol and a polyether polyol in amounts sufficient to form a polyol having a number-average molecular weight of 1,000 to 10,000 or 2,000 to 10,000, or 2,000 to 4,000, or 3,000 to 4,000 measured by assay of terminal functional groups; (ii) reacting the polyol component with a diisocyanate; and (ii) forming an article by extrusion or molding.

The thermoplastic polyurethane of the present invention may be used to make articles or as an additive to improve the heat resistance of an article.

In one embodiment, the ingredients are mixed on a single or twin screw extruder with multiple heat zones and multiple feed ports between its feed end and its die end. The ingredients may be added at one or more of the feed ports and the resulting thermoplastic polyurethane composition that exits the die end of the extruder may be pelletized.

The preparation of the thermoplastic polyurethane compositions of the invention can be done by any known conventional procedures and methods or those hereafter developed. The amounts of specific components thereof, the various reactant ratios, processing temperatures, catalysts in the amount thereof, polymerizing equipment such as the various types of extruders, and the like, would be understood by those skilled in the art.

One or more polymerization catalysts may be present during the polymerization reaction. Generally, any conventional catalyst can be utilized to react the diisocyanate with the polyol intermediates or the chain extender. Examples of suitable catalysts which in particular accelerate the reaction between the NCO groups of the diisocyanates and the hydroxy groups of the polyols and chain extenders are the conventional tertiary amines known from the prior art, e.g.

triethylamine, dimethylcyclohexylamine, N-methylmorpholine, N,N'-dimethylpiperazine, 2-(dimethylaminoethoxy) ethanol, diazabicyclo[2.2.2]octane and the like, and also in particular organometallic compounds, such as titanic esters, iron compounds, e.g. ferric acetylacetonate, tin compounds, e.g. stannous diacetate, stannous dioctoate, stannous dilaurate, or the dialkyltin salts of aliphatic carboxylic acids, e.g. dibutyltin diacetate, dibutyltin dilaurate, or the like, phenyl mercuric propionate, lead octoate, iron acetylacetonate, magnesium acetylacetonate, or bismuth compounds such as bismuth octoate, bismuth laurate, and the like.

The thermoplastic polyurethane composition of the present invention may have a Shore A hardness of 95A or less, for example, 35A to 95A, further for example, 50A to 95A.

Other optional components can be present during the polymerization reaction, and/or incorporated into the thermoplastic polyurethane composition described above to improve processing and other properties. These additives include but are not limited to antioxidants, such as phenolic types, organic phosphites, phosphines and phosphonites, hindered amines, organic amines, organo sulfur compounds, lactones and hydroxylamine compounds, biocides, fungicides, antimicrobial agents, compatibilizers, electro-dissipative or anti-static additives, fillers and reinforcing agents, such as titanium dioxide, alumina, clay and carbon black, flame retardants, such as phosphates, halogenated materials, and metal salts of alkyl benzenesulfonates, impact modifiers, such as methacrylate-butadiene-styrene ("MBS") and methylmethacrylate butylacrylate ("MBA"), mold release agents such as waxes, fats and oils, pigments and colorants, plasticizers, polymers, rheology modifiers such as monoamines, polyamide waxes, silicones, and polysiloxanes, slip additives, such as paraffinic waxes, hydrocarbon polyolefins and/or fluorinated polyolefins, and UV stabilizers, which may be of the hindered amine light stabilizers (HALS) and/or UV light absorber (UVA) types. Other additives may be used to enhance the performance of the thermoplastic polyurethane composition or blended product. All of the additives described above may be used in an effective amount customary for these substances.

These additional additives can be incorporated into the components of, or into the reaction mixture for, the preparation of the thermoplastic polyurethane composition, or after making the thermoplastic polyurethane composition. In another process, all the materials can be mixed with the thermoplastic polyurethane composition and then melted or they can be incorporated directly into the melt of the thermoplastic polyurethane composition.

The thermoplastic polyurethane compositions of the present invention or any blends thereof may also be used to prepare various articles using known techniques such as extrusion or molding. Extrusion or molding processes are well known to those of ordinary skill in the art and include but are not limited to, cast molding, cold forming matched-die molding, compression molding, foam molding, injection molding, gas-assisted injection molding, profile co-extrusion, profile extrusion, rotational molding, sheet extrusion, slush molding, spray techniques, thermoforming, transfer molding, vacuum forming, wet lay-up or contact molding, blow molding, extrusion blow molding, injection blow molding, and injection stretch blow molding or combinations thereof.

The thermoplastic polyurethane compositions of this invention may be used to make articles for applications where a thermoplastic polyurethane that is heat resistant is desired. The thermoplastic polyurethane composition may be used in parts or components for automotive, electronics, portable electronic, electronic accessories, electrical, communication, appliances and medical applications. For example, they may be used to produce components of cable insulation, automotive parts, electronics, and appliances.

Other applications may include but are not limited to protective covers; liquid line component and air ducts; architectural seals; bottle closures; furniture components; resistant and soft-feel grips for hand held devices; packaging components such as seals, bottles, cans, cups; medical and hygiene devices; cookware parts and accessories; sporting and leisure goods such as rackets, bike parts; footwear soles, toys, and general rubber parts; medical devices; sporting goods; wearable devices (watch bands, fitness trackers, nose pads for glasses); and general rubber parts.

The invention is further illustrated by the Examples below. In the Examples, PCL-BDO (2000) refers to a polyol component made from the reaction of ε-caprolactone initiated with 1,4-butanediol having a number-average molecular weight of 2000. PCL-PTMG (1500) refers to a polyol component made from the reaction of ε-caprolactone initiated with poly(tetramethylene glycol) having a number-average molecular weight of 1500. PCL-PDMS-PTMG (3500) refers to a polyol component made from the reaction of ε-caprolactone initiated with linear polydimethylsiloxane propylhydroxy copolymer and poly(tetramethylene glycol) having a number-average molecular weight of 3500. The PCL-PDMS-PTMG (3500) is made by adding 1479 parts by weight of ε-caprolactone to a reactor and heating at 100° C. under vacuum with stirring for 2 hours to reduce the water content to less than 0.05% by weight. A mixture of 2190 parts of polydimethyl siloxane and 5 parts Irganox® 1010 alkylated phenol antioxidant is added to the reactor and heated to 180° C. while stirring. 20 ppm of tin octanoate is added as a 1% solution in ε-caprolactone. The reaction is maintained at 175°-180° C. for 4 hours during which time an additional 100 ppm of tin octoate is added as a 1% solution in ε-caprolactone. When the caprolactone monomer content in the reaction mixture is 0.25% by weight or less, 675 parts by weight of additional ε-caprolactone monomer and 675 parts by weight of PTMG initiator are added to the reaction mixture. The reaction is maintained at 175° C. to 180° C. until the caprolactone monomer content is 0.25% by weight or less. BDO refers to 1,4-butane diol. HQEE refers to hydroquinone bis-(2-hydroxyethyl) ether. SPG refers to 3,9-bis(1,1-dimethyl-2-hydroxy ethyl)-2,4,8,10-tetraoxaspiro[5 5]undecane. MDI refers to 4,4'-methylenebis(phenyl isocyanate). HDI refers to hexamethylene diisocyanate.

A series of thermoplastic polyurethane compositions were formed by reacting the components noted in Table 1.

TABLE 1

|  | C1 | C2 | C3 | C4 | Example 1 |
|---|---|---|---|---|---|
| Polyol (MW) | PCL-BDO (2000) | PCL-BDO (2000) | Blend of PDMS initiated PCL and PTMG2 | PCL-PTMG (1500) | PCL-PDMS-PTMG (3500) |

TABLE 1-continued

|  | C1 | C2 | C3 | C4 | Example 1 |
|---|---|---|---|---|---|
| Diisocyanate | MDI | HDI | HDI | MDI | HDI |
| Hard Segment (%) | 30 | 33 | 17 | 30 | 17 |
| Chain Extender | BDO | BDO | PSG | BDO | PSG |
| Hardness (Shore A) | 85 | 85 | — | 85 | 68 |
| TMA[1] (Onset ° C.) | 140° C. | 122° C. | — | 155° C. | 220° C. |

[1]Thermomechanical Analysis: Thermograms were recorded over a temperature range of −25° C. to 250° C. on a Mettler TMA/SDTA 2+ Unit. Analysis was carried out at a heating rate of 10° C./min. The plaques were used as a sample in a test penetration type. The applied force was 0.02N.
[2] Sample could not be tested due to delamination caused by lack of compatibility of the components.

As shown by the tables above, the inventive thermoplastic polyurethane compositions provide superior results over other polycaprolactone based thermoplastic polyurethanes.

What is claimed is:

1. A thermoplastic polyurethane composition comprising the reaction product of:
   (a) a polyol component made from the reaction of ε-caprolactone initiated with a polydimethylsiloxane polyol and a polyether polyol, wherein the polyol component is a bimodal polycaprolactone polyol;
   (b) a diisocyanate.

2. The thermoplastic polyurethane composition of claim 1 further comprising a chain extender component.

3. The thermoplastic polyurethane composition of claim 2 wherein the chain extender comprises 1,4-butanediol.

4. The thermoplastic polyurethane of claim 2, wherein the chain extender comprises hydroquinone bis-(2-hydroxyethyl) ether.

5. The thermoplastic polyurethane of claim 2, wherein the chain extender comprises pentaspiro glycol.

6. The thermoplastic polyurethane composition of claim 1, wherein the diisocyanate comprises 4,4'-methylenebis (phenyl isocyanate).

7. The thermoplastic polyurethane composition of claim 1, wherein the diisocyanate comprises hexamethylene diisocyanate.

8. The thermoplastic polyurethane of claim 1, wherein the polyol component has a number-average molecular weight of 1,000 to 10,000 measured by assay of terminal functional groups.

9. The thermoplastic polyurethane of claim 1, wherein the polyol component has a number-average molecular weight of 2,000 to 4,000 measured by assay of terminal functional groups.

10. The thermoplastic polyurethane of claim 1, wherein the ε-caprolactone polydimethylsiloxane and ε-caprolactone are present in a molar ratio of from 1:12 to 1:15.

11. The thermoplastic polyurethane of claim 1, wherein the polyol component comprises the reaction product of 24% to 94% by weight of ε-caprolactone, 3.5% to 66% by weight of polydimethylsiloxane, and 2.5% to 21% by weight % of polyether.

12. The thermoplastic polyurethane of claim 1, wherein the polyol component comprises the reaction product of polydimethylsiloxane having a number-average molecular weight of 500 to 10,000, polyether having a molecular weight of 500 to 1000, and a sufficient amount of ε-caprolactone to form a polyol having a number-average molecular weight of 1500 to 10,000.

13. The thermoplastic polyurethane of claim 1, wherein the polyether polyol comprises poly(tetramethylene ether glycol).

14. The thermoplastic polyurethane of claim 1, wherein the polyether polyol consists of poly(tetramethylene ether glycol).

15. The thermoplastic polyurethane of claim 1, wherein the polyol component is formed by the steps of:
   (a) providing a reaction mixture comprising polysiloxane initiator and ε-caprolactone in a molar ratio of 1:12 to 1:15;
   (b) reacting the reaction mixture to form a polyol intermediate species;
   (c) adding additional ε-caprolactone and polyether initiator to the reaction mixture and polyol intermediate species to form a polyol.

16. The thermoplastic polyurethane of claim 15, wherein the polyol intermediate species comprises

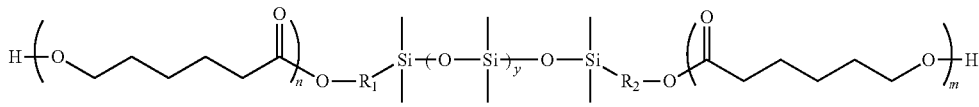

where n and m are individually 0 to 15, provided that n+m is at least 12, y is 25 to 33, and $R_1$ and $R_2$ are the same or different and are selected from linear or branched $C_1$ to $C_{10}$ groups.

17. The thermoplastic polyurethane of claim 16, wherein $R_1$ and $R_2$ are the same or different and are selected from methyl, ethyl, n-propyl, iso-propyl, n-butyl, iso-butyl, phenyl, cyclohexyl, methoxyethyl, or 3,3'-oxidipropyl.

18. An article made from the thermoplastic polyurethane composition of claim 1.

19. A process for making a thermoplastic polyurethane comprising the steps of:
   (i) making a polyol comprising the reaction product of ε-caprolactone initiated with a polydimethylsiloxane polyol and a polyether polyol, wherein the polyol is a bimodal polycaprolactone polyol;
   (ii) reacting the polyol with a diisocyanate.

20. The process of claim 19, wherein the step of making a polyol comprises the steps of:
   (a) providing a reaction mixture comprising ε-caprolactone and polysiloxane initiator in a molar ratio of 1:12 to 1:15;
   (b) reacting the reaction mixture to form a polyol intermediate species;

(c) adding additional ε-caprolactone and polyether initiator to the reaction mixture and polyol intermediate species to form a polyol.

21. The process of claim 19, wherein the polyol intermediate species comprises

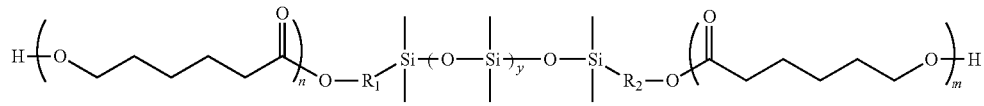

where n and m are individually 0 to 15, provided that n+m is at least 12, y is 25 to 33, and $R_1$ and $R_2$ are the same or different and are selected from linear or branched $C_1$ to $C_{10}$ groups.

22. The process of claim 21, wherein $R_1$ and $R_2$ are the same or different and are selected from methyl, ethyl, n-propyl, iso-propyl, n-butyl, iso-butyl, phenyl, cyclohexyl, methoxyethyl, or 3,3'-oxidipropyl.

* * * * *